United States Patent [19]

Keim et al.

[11] Patent Number: 5,255,854

[45] Date of Patent: Oct. 26, 1993

[54] BURNER HEAD FOR GAS BURNERS

[75] Inventors: Norbert Keim, Bietigheim-Biss; Klaus Görner, Ratingen; Martin Käss, Stuttgart, all of Fed. Rep. of Germany

[73] Assignee: Alcatel N.V., Amsterdam, Netherlands

[21] Appl. No.: 788,380

[22] Filed: Nov. 6, 1991

[30] Foreign Application Priority Data

| Nov. 8, 1990 [DE] | Fed. Rep. of Germany | 4035502 |
| Nov. 28, 1990 [DE] | Fed. Rep. of Germany | 4037751 |
| Feb. 22, 1991 [DE] | Fed. Rep. of Germany | 4105608 |

[51] Int. Cl.5 .............................................. B05B 1/14
[52] U.S. Cl. ................................... 239/556; 239/568
[58] Field of Search ............... 239/548, 568, 561, 555, 239/556, 566

[56] References Cited

U.S. PATENT DOCUMENTS

| 2,713,894 | 7/1955 | Sage | 239/555 |
| 3,156,292 | 11/1964 | Ross | 239/561 |
| 3,409,233 | 11/1968 | Kiernan | 239/556 |
| 4,081,136 | 3/1978 | Addoms et al. | 239/555 |
| 4,270,702 | 6/1981 | Nicholson | 239/568 |

FOREIGN PATENT DOCUMENTS

| 2132968 | 1/1972 | Fed. Rep. of Germany | 239/550 |
| 495322 | 10/1952 | Italy | 239/526 |
| 881770 | 1/1960 | United Kingdom | 239/561 |

Primary Examiner—Andres Kashnikow
Assistant Examiner—Kevin Weldon
Attorney, Agent, or Firm—Ware, Fressola, Van der Sluys & Adolphson

[57] ABSTRACT

A burner head for gas burners with a number of gas outlet nozzles for the temperature treatment of profiles, particularly for the temperature treatment of elongated profiles, in which a relative movement between these and the burner head takes place, features gas outlet nozzles (2, 3), terminating in a plane (4) common to all nozzles, in which, as a result of the spatial arrangement of the nozzle outlets (2, 3) with respect to each other, these cover a rectangular area section of the plane.

23 Claims, 2 Drawing Sheets

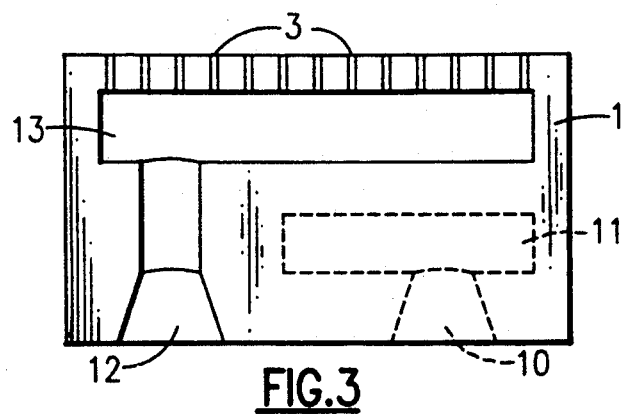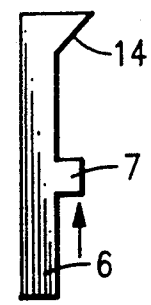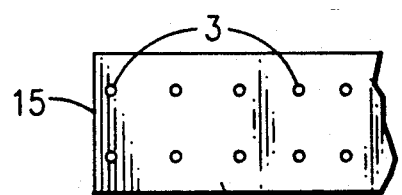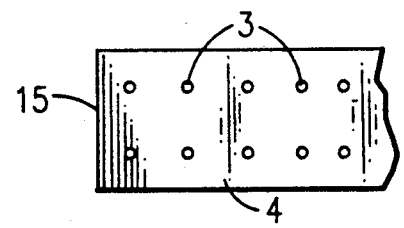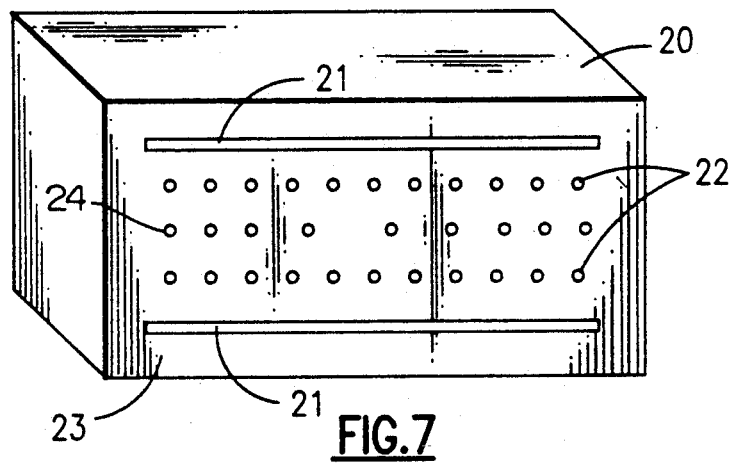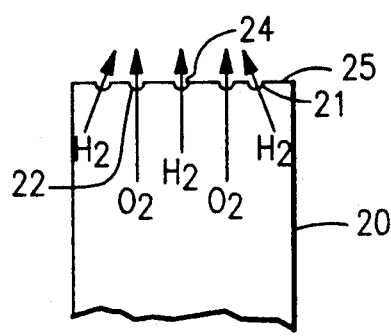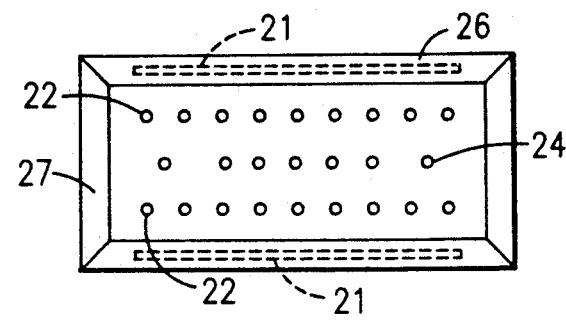

BURNER HEAD FOR GAS BURNERS

BACKGROUND OF THE INVENTION

1. Field of the Invention

The present invention relates to a burner head for gas burners with a number of gas outlet nozzles for the temperature treatment of profiles, particularly for the temperature treatment of elongated profiles, in which a relative movement between these and the burner head takes place.

2. Description of the Prior Art

Gas burners of the above-mentioned type have been used for a long time and, when supplied with the appropriate gases, for example, hydrogen and oxygen, high operating temperatures for the treatment of the material in question can be reached. Depending on the external form or the external dimensions of the profiles to be treated, the burner types in question show different shapes and dimensions. Thus, the burners can be designed as so-called half-shell ring burners but can also be full-ring burners with or without radial protective veils and so-called free-jet burners, in which the oxygen emerges at high velocity from the individual nozzles of the burner heads. In this case, the burner heads and the nozzles, can be rotatable, tiltable, and variable in their spacings from each other. The latter possibility is also provided by a known gas burner (German Patent 34 00 710), which serves in particular for the heating of glass tubes in the production of preforms for optical glass fibers. The displacement of the individual burner heads relative to each other provided in this known burner and the orientation with respect to the axis of rotation of the glass body to be treated are intended to provide the possibility for providing broad or narrow heating zones, in order to satisfy the requirements of glass fiber production technology.

A disadvantage in this known burner, but also in all previously-mentioned ones, is the fact that, as a result of the opening angle set by the design of the known burner types, a narrow limitation and a sharp edge of the heating zones are not possible. However, narrow temperature limits are important when, for example, regions of a metal band are to be subjected to a continuous annealing process during a temperature treatment or, as already indicated in connection with the above-mentioned patent, broad or narrow heating zones are required for the particular process stages in glass fiber production.

SUMMARY OF THE INVENTION

Starting from the state of the art, the invention is based on the task of finding a possibility, in a burner head of the above-mentioned type, to provide specific temperature profiles adapted to the particular use of the gas burner.

This problem is solved according to the invention in a burner head for gas burners by the fact that the gas outlet nozzles terminate in a plane common to all nozzles, in which, as a result of the spatial arrangement of the nozzle outlets with respect to each other, these cover a rectangular areal section of the plane. With a burner head designed in this way, previously customary heat treatment processes can be optimized, and, as a result of the minimization of the opening diameter of the nozzles achieved by the invention, the gas throughput for operation of the burner can be reduced. This is of interest, in particular, for all processes in which long operating times must be expected in the temperature treatment of elongated profiles. This also applies, in particular, for the production of glass fibers from so-called preforms, in which the core glass material is deposited on the inner wall of a glass tube by chemical deposition, the internally-coated glass tube is caused to collapse by temperature treatment, and the preform for use in this manner is finally drawn out into a glass fiber.

If, in a case of this type, for example, it is desired to improve the quality of the preform and to increase the production rate, then, in accordance with a previous proposal, the temperature treatment for collapse along the glass tube can be carried out in accordance with a temperature profile that is determined by an upper region of maximum glass temperature along the treated section of the glass tube and a region of glass softening temperature, where the region of maximum glass temperature shows a largely uniform temperature level, with a width along the glass tube section approximating the width of the region of glass softening temperature. For this area of application, the burner designed according to the invention provides optimum prerequisites, because the plateau level important for the so-called burner profile, the plateau width, and the stability width are adjustable within narrow temperature limits.

In carrying out the invention, it has proved particularly advantageous if the gas outlet nozzles for the mixing components show different geometric shapes and/or dimensions at least in the gas outlet region. As a result of this it is possible to carry out a perfect mixing-in or mixing of the gas components, such as, for example, hydrogen and oxygen, and in this way to create optimal operating conditions. This applies particularly when the outer longitudinal limitation of the areal section consists of gas outlet nozzles in the form of slots for one mixing component, between which there are arranged holes as gas outlet nozzles for the second mixing component. If, for example, hydrogen emerges from the burner head through the slot-shaped nozzle and oxygen emerges through the holes between the two slots, then, as a result of the higher density and the selected high pulsed stream of the oxygen, its individual jets are dominant in the mixing process between the two components, in which the hydrogen is mixed in and forms the ignitable mixture.

If, as is provided in accordance with another inventive thought, the gas outlet nozzles in the ground body for the one component are arranged in rows parallel to the lateral slots for the other mixing component, then the separation of the holes in the longitudinal direction can advantageously be selected to be different. In this manner it is possible, in accordance with the requirements based on the profile to be treated in each case and the existing distance between the burner and product, to adjust the most favorable burning width in each case. Thus, a constant temperature over the whole plateau width of the temperature profile can be ensured. For example, for this purpose, the distances between two holes, seen from the center of the longitudinal slots, can be allowed to increase initially and then, toward the end of the longitudinal slots, to decrease.

A particularly advantageous embodiment of the invention is obtained when the burner head consists of a basic body with holes as gas outlet nozzles and two separate side parts, which can be assembled with the basic body and, in the assembled state, include the slot-shaped gas outlet nozzles between them and the corresponding areas of the basic body. This design results in the fact that the opening angle of the flame in both directions is very small and, thus, the flame enveloping surface is very sharp. In this manner, high temperature gradients can be achieved, which are required, in particular, in the above-mentioned rectangular temperature profiles in the production of glass fibers for the transmission of optical signals.

The basic body and the side parts are advantageously welded to each other, so that a unified burner head is produced. As a result of the multi-part nature of the burner head, a high precision in the production of the holes, the slots, and the supply channels is possible, so that optimal requirements for a good gas throughput are created.

In continuation of the invention, the basic body will be suitably designed as a profile with a T-shaped cross-section, in whose recesses on both sides the side parts can be integrated. For a burner head with a rectangular cross-section, the side parts are designed as plates. The supply holes for the two gas components are provided in the broad part of the basic body, while the holes for passage of the oxygen are arranged in the narrow part of the T-shaped profile.

The inlets for the mixing components which are arranged on the side of the burner head opposite the nozzle outlet area and in chambers with a large volume as compared with the dimensions of the slots and the holes, from which the holes and slots lead to the outside. The large-volume nature of the supply and distribution channels for the two components, particularly hydrogen and oxygen, were made with as large a volume as possible and with defined constrictions in order to establish a small pressure drop in the distribution channels and a large pressure drop in the constrictions, and, in this way, to ensure uniform pressure drops and outflow relationships for all holes and for the hole slot. The quality of the ignited flame can be improved further in this way.

The design of the burner head according to the invention as a profile with a T-shaped cross-section, with integratable side parts, has the further advantage that the holes for the oxygen can be produced with a very good alignment and with a high surface quality and without pull-off edges. In this way, a high-pulsed stream of oxygen is possible, whose individual jets are decisively involved in the mixing process between hydrogen and oxygen. In this connection, it has also proved appropriate if the exit cross-sections for the hydrogen and oxygen are selected in such a way that a velocity ratio $H_2/O_2 = \frac{1}{3}$ is achieved.

For the burner head according to the invention it is also important that, by means of the mechanical construction, means can be provided for controlling the flow of the gas components up to the exit or outlet nozzles in order to optimize the flame quality in this way. Another step is that, in a continuation of the inventive thought, the side parts designed as plates feature a longitudinal web, which, by joining the side part in question with the basic body, forms an upper and a lower chamber for one mixture component, with the spatial connection between the two chambers being provided by a longitudinal slot remaining between the web and the basic body. In this case, the outer edge of the exit cross-section is suitably provided with a conical area directed at the flame axis. In this way, it is possible to impart to the flowing gas, before exit from the actual nozzle, an additional velocity component directed at the flame axis.

As stated above, the burner according to the invention can be used for a wide variety of technical areas, but most meaningfully in those cases where it is a question of carrying out the temperature treatment by means of a burner flame with clearly fixed external dimensions. A special area of application is the production of a preform for glass fiber optical waveguides and, in this case, particularly the temperature treatment that is described in a prior German Patent Application No. P 40 20 101.5 corresponding to U.S. Pat. Ser. No. 07/718,626 filed Jun. 21, 1991. It has been found that, in order to reduce the collapse time and to improve the product quality, a temperature profile that is as rectangular as possible is required. For this purpose, the burner according to the invention provides the best prerequisites. Thus, a significant saving of time is obtained when burner heads according to the invention are used, as compared to known arrangements. This applies, in particular, for those manufacturing processes in which large lengths are run without interruption. But the throughput of combustion gases is also significantly reduced, without this leading to an increase in the collapse time. In addition, the collapse time provides a saving in time on the basis of the profile comparison, so that the energy consumption is also reduced.

As far as the adjustment time of the burner is concerned, this can be significantly reduced as compared with all known burner types, aside from the fact that the special arrangement of the exit nozzles for the mixture components leads to a minimal burn-up at the nozzles.

As stated, in the production of glass fibers from so-called preforms, in which the core glass material is applied by chemical deposition from the gas phase on the inner wall of a glass tube, the internally-coated glass tube is caused to collapse by temperature treatment, and the preform thus prepared is drawn out to a glass fiber. For this area of application, the proposed burner provides optimal prerequisites, because the plateau height that is important for the so-called burner profile, i.e., the temperature course over a specific section of length of the glass tube to be treated (temperature profile), the plateau width, and the stability width are adjustable within narrow temperature limits. The arrangement of slots as gas outlet nozzles for the hydrogen and the holes as such for the oxygen lead to a problem-free mixing-in or mixing of the two gas components, so that optimal operating conditions are achieved. This is because, as a result of the higher density of the oxygen as compared to that of the hydrogen and the selected high pulsed stream of the oxygen, its individual jets are dominant in the mixing process of the two components.

A further improvement in the execution of the invention is obtained by the fact that, between the holes for the second mixture component, there is arranged at least one row of additional gas outlet nozzles for the second mixture component of the gas mixture. This measure leads to an even more favorable premixing of the two gas components, and thus to an increase of the burner temperature, because the energy from the flowing gases hydrogen and oxygen is concentrated in the flow zone. For the temperature or burner profile, the invention represents a further stabilization of the upper temperature plateau, and any previously partially appearing breaks in the upper temperature level are prevented.

The other gas outlet nozzles can be longitudinally proceeding longitudinal slots arranged in parallel to the longitudinal slots for the first mixture component for the holes. However, these additional longitudinal slots can also be interrupted, so that, seen in the direction of the consecutively arranged holes, a row of longitudinal slots of shorter length arranged at intervals is obtained. This last measure already leads to an improvement in the premixing by the higher exit velocity of the hydrogen, and it is improved further if, in continuation of the inventive thought, the gas outlet nozzles for the first mixture component are also designed as holes. It is of advantage for the premixing in this connection that the spacings of the holes for the first mixture component from each other are independent of those of the holes for the second mixture component.

In continuation of the invention, the additional gas outlet nozzles for the first mixture component terminate in a large-volume chamber at the end facing away from the plane of exit. As already explained, this measure, in connection with defined constrictions in the gas supply line, serves to ensure a pressure drop and uniform outflow conditions for all holes and slots. The quality of the ignited flame can be further improved in this way.

A further possibility for optimizing the mixing of the two gas components and for ensuring a concentration of the burner flame is obtained if, in continuation of the invention, separate deflecting surfaces for the gas stream are provided in the region of the gas outlet nozzles. These deflecting surfaces, for example, in the form of a guiding surface limiting the burner surface, directed inward in a roof-like manner lead to a premixing of the exiting gas component and thus to an increase in the mixing time.

The spatial distribution of the first mixture component over the slots arranged along the burner head or over the holes or slots for the first mixture component arranged between the holes for the second component can be carried out, for example, by the fact that the additional gas outlet nozzles, slots or holes are supplied by separate gas supply lines connectable to the burner head. However, it is also possible and contributes to the compactness of the burner according to the invention, if the additional gas outlet nozzles are supplied by the same gas supply lines as the slot-shaped gas outlet nozzles, with the separation of the gas flows on the two sides taking place in the interior of the burner head. In this case, the division of the gas flows on the two sides in the interior of the burner head can have a value of, for example, 90 percent to 10 percent, i.e., the main part of the hydrogen used, for example, is supplied to the flame through the outer slots proceeding along the burner head.

Processes for the production of a preform for glass fiber optical waveguides with a core and a single-layer or multi-layer cladding are carried out in which the core glass material is applied by chemical deposition from the gas phase to the inner wall of a glass tube, the internally-coated glass tube is caused to collapse by temperature treatment, and this preform is finally drawn out to a glass fiber. The temperature treatment for coating along the glass tube in this case is carried out in accordance with a temperature profile with a broad temperature distribution which is determined by an upper region of maximum reaction temperature along the treated glass tube section and broader regions located underneath for establishing a sintering temperature and for preheating of the gaseous chemicals, with the individual regions being changeable in their width with respect to each other. A temperature distribution of this type makes possible optimal operating conditions because, for the coating, a preheating of the chemicals takes place below the lowest reaction temperature and, within the final preheating section, the gases are brought to the maximum reaction temperature. In the region of this broad hot zone, a complete reaction with homogeneous particle formation takes place and, finally, the width of the region that is at the sintering temperature ensures a uniform sintering of the particles deposited on the inner wall of a tube.

The burners according to the invention are particularly suitable for the temperature treatment required in this case. They make possible a temperature profile that is produced by flame profiles with a rectangular cross-section. This measure leads to an even more effective conversion of chemicals, the deposition rate within the glass tube is increased, and the sintering of the particles is improved. Added to this is the fact that, in this manner, the fuel consumption is reduced and the temperature profile characteristics can be kept constant over the whole preform length.

For the heat treatment, gas burners made up of burner heads containing a number of nozzles and movable in the axial direction of the glass tube are used. In this case, the invention provides for the fact that, of the burner heads within the burner, of a total of three, two are arranged laterally to the tube and opposite each other, and one is arranged below the tube, with the burning surfaces proceeding in the axial direction of the tube and having a rectangular shape. This measure permits the use of fewer burner heads, the adjustment time is reduced, and the reproducibility of the desired temperature profile is ensured at all times. As a result of the fact that the burner heads used according to the invention are made of temperature-resistant and scale-resistant metallic material, e.g., special steel, a higher operating reliability is obtained as compared with the known glass burners.

In continuation of the inventive thought, the burner located below the glass tube is located in an axial direction ahead of the two lateral burners. In this way, it is ensured that the tube temperature is maintained and the inflowing gases are effectively preheated.

For the invention, it is important that the desired temperature profile during the coating process is maintained and the temperature course is optimized, i.e., temperature fluctuations, jumps and the like are compensated. According to a further inventive thought, a contribution to this is made by the fact that the edges of the burner heads facing each other in the axial direction are located in the same plane.

DESCRIPTION OF THE DRAWINGS

The invention will be explained in greater detail with reference to the exemplifying embodiments shown in FIGS. 1–11.

FIG. 3 is a vertical section of the burner head of FIG. 1.
FIG. 4A is an end view of the side plate of FIG. 2A.
FIG. 5 is a partial top view of the burner body of FIG. 2.
FIG. 6 is a partial top view of the burner body of FIG. 2.

FIG. 7 is a perspective view of a burner head.

FIG. 8 is a schematic illustration of the gas flow within a head.

FIG. 9 is a top view of a burner body.

DETAILED DESCRIPTION OF THE INVENTION

Figure 1:
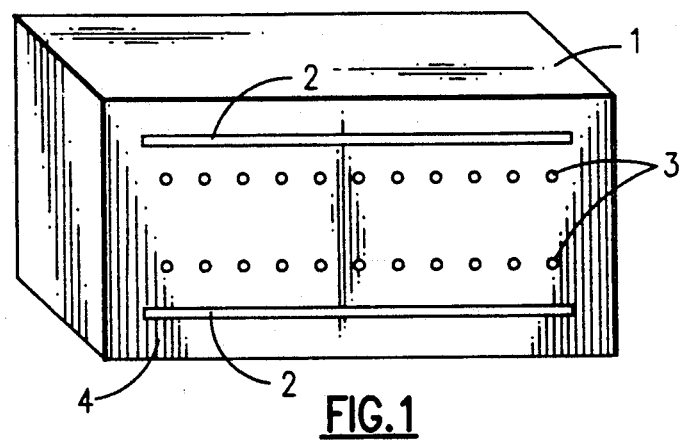
FIG. 1 is a perspective view of a burner head.

FIG. 1 shows a burner head 1 according to the invention in perspective view, which is operated, for example, with hydrogen ($H_2$) and oxygen ($O_2$). The longitudinally proceeding slots 2 are provided as gas outlet nozzles for the hydrogen, while the oxygen exits through the holes 3 arranged consecutively in a longitudinal direction between the slots. The hydrogen is mixed into the oxygen, so that the ignitable gas mixture is formed above the plane 4 that is common to all nozzles. As a result of the arrangement of the nozzles 2 and 3, a rectangular flame profile with narrow temperature limits is formed.

Figures 2, 2A:
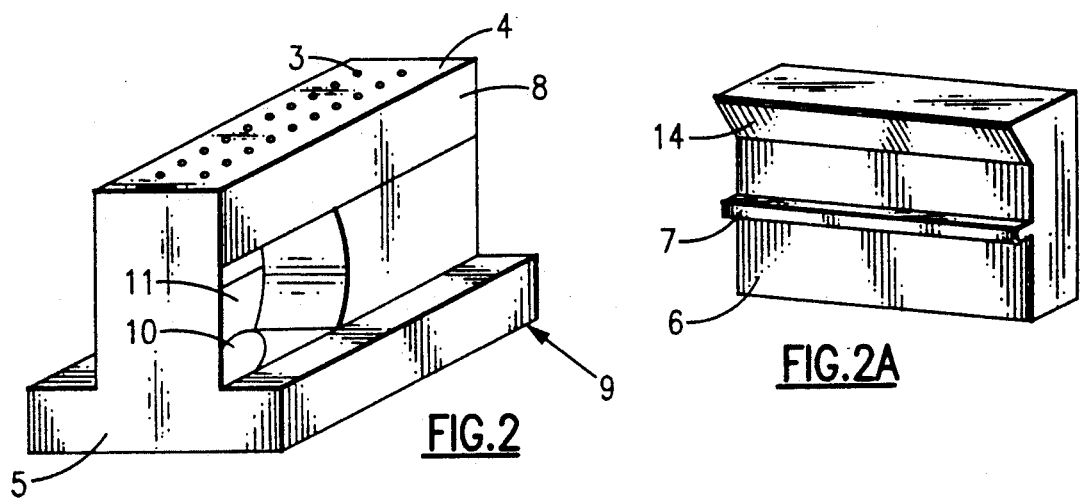
FIG. 2 is a perspective view of a burner body.
FIG. 2A is a perspective view of a burner side part.

FIG. 2, also in a perspective view, shows the basic body 5, with a T-shaped cross-section, of the burner head 1, with the holes for the passage of oxygen provided at the upper limiting surface. The T-profile shown is completed to form a burner profile with a rectangular cross-section by means of two plate-shaped side parts 6 shown in FIG. 2A, which are welded to the T-shaped profile 5 at the side edges. A central web 7 on the inner surface of the side elements 6, after assembly of the T-shaped basic body 5 and the side elements 6, does not reach as far as the side surface of the T-shaped basic body, so that, in the region of the web 7, a longitudinally proceeding narrow gap is formed, which exerts a nozzle action on the hydrogen gas flowing through, and additionally accelerates the gas in the direction of the slot 2. The distribution chambers formed before and behind the web 7, in combination with the pressure drop induced by the web 7, cause an optimal transverse distribution of the gas flow. On the side 9 of the basic body with a T-shaped cross-section facing away from the surface 4, the gas inlets are provided in the form of holes, where hydrogen passes through the hole 10 shown and then passes through the chamber 11, open on both sides, in the assembled state of the basic body 1 and side plates 6 to the webs 7.

The arrangement of the holes and chambers in the basic body 1 is made clear in a section in FIG. 3. As already described with reference to FIG. 2, the hole 10 for hydrogen supply terminates in the chamber 11. The second hole 12 serves for the supply of oxygen, which passes into the chamber 13, arranged in a plane displaced with respect to that of chamber 11, and to which are connected the holes 3 through which the oxygen passes to the flat surface 4 and which, at the same time, exert a nozzle function. As already indicated, the supply and distribution holes for the gas components and the chambers are made with a large volume, in order to produce as small as possible a pressure drop, which is uniform for all holes 3 and the slots 2.

FIG. 4 shows a side plate integrable into the basic body 1 in cross-section, with a center web 7 for acceleration of the hydrogen gas flowing in the direction of the arrow, with a limiting surface 14 proceeding at an angle to the upper edge of the side plate.

In order to ensure a constant operating temperature over the whole plateau width produced by the rectangular burner head, the holes 3, in execution of the invention, are not arranged at uniform intervals from each other. As FIGS. 5 and 6 show in two possible variants, the spacings are instead initially increased in an inward-to-outward direction and then again assume smaller values at the edges. Thus, FIG. 5 shows the upper planar surface of a burner head according to the invention, in which the holes 3 are arranged with a hole diameter, for example, 1.0 mm in two rows, with an intended spacing between the rows of 5 mm. It is important that, in order to achieve a constant operating temperature over the whole range of areas, the distances between two holes in a row are 3.3 mm and then increased to 4.5 mm near the outer edges 15. The spacing between the last hole 3 and the outer edge 15 is therefore only 2 mm.

Another possibility is shown in FIG. 6, in which, for example, holes 3 with a diameter of 1.04 mm are arranged in the basic body, which terminate in the planar surface 4 with good alignment and without tear-off edges. The spacing of the holes 3 in the two rows initially starts at 3 mm and then increases to 4 mm near the outer edges 15, while the spacing between the last hole and the outer edge 15 has a value of only 3 mm.

FIG. 7 shows a burner head 20 according to the invention in perspective view, which is operated, for example, with hydrogen ($H_2$) and oxygen ($O_2$). The longitudinally proceeding slots 21 are provided as gas outlet nozzles for the hydrogen, while the oxygen exits through the holes 22 arranged consecutively in a longitudinal direction between the slots. The hydrogen is mixed into the oxygen, so that the ignitable gas mixture is formed above the plane 23, which is common to all nozzles. As a result of the arrangement of the nozzles designed as slots 21 and holes 22, a rectangular homogeneous flame profile with abruptly decreasing temperature at the boundaries is formed. As a result of the holes arranged as outlet nozzles for the oxygen, which can be prepared with good alignment, high surface quality, and without tear-off edges, a high pulsed stream of oxygen is possible, whose individual jets are decisively involved in the mixing process between hydrogen and oxygen.

A further concentration of the hydrogen or oxygen exiting from the nozzles in the flow zone can be achieved according to the invention by the fact that a row of additional holes 24 for the hydrogen is arranged between the holes 22 for the oxygen. It is noticeable that unused hydrogen can no longer flow off toward the outside, and the energy from hydrogen and oxygen that is now supplied to the burner flame in a concentrated form leads to an increase in the flame temperature and a standardization of the temperature profile, particularly of the temperature plateau.

FIG. 8 is a schematic representation of the flow course of the preferably-used gases hydrogen and oxygen in a burner head according to the invention. The burner head 20, in turn, features the longitudinally proceeding slots 21 and the holes 22 or the additional holes 24 between the two rows of holes 22. Through the longitudinal slots 21 there flows hydrogen, which is deflected by longitudinally proceeding diagonals 25 within the burner body in the direction of oxygen exiting from the holes 22. Arrows mark the flow direction, with the more thickly drawn arrows of the hydrogen exiting from the longitudinal slots 21 simultaneously providing information about the flow quantity. Thus, in the exemplifying embodiment shown, of the hydrogen quantity required overall, the amount of hydrogen flowing through the slots 21 amounts to, for example, 90 percent, while the hydrogen flowing through the holes 24 amounts to only 10 percent. Predominantly therefore, the oxygen exiting at high velocity obtains the required hydrogen quantity from the sides, but an additional concentrated mixing takes place simultaneously in the central region of the burner head designed according to the invention.

Finally, FIG. 9 shows a variation in which, in addition to or instead of the diagonals arranged in the interior of the burner head, external deflecting edges 26 in the longitudinal direction and proceeding above the slots 21 and corresponding elements 27 transverse to these are provided. The oxygen exiting largely from the holes 22 draws after it in a concentrated form the hydrogen both from the slots 21 and also from the holes 24 into the flame profile of the burner.

Figures 10, 11:
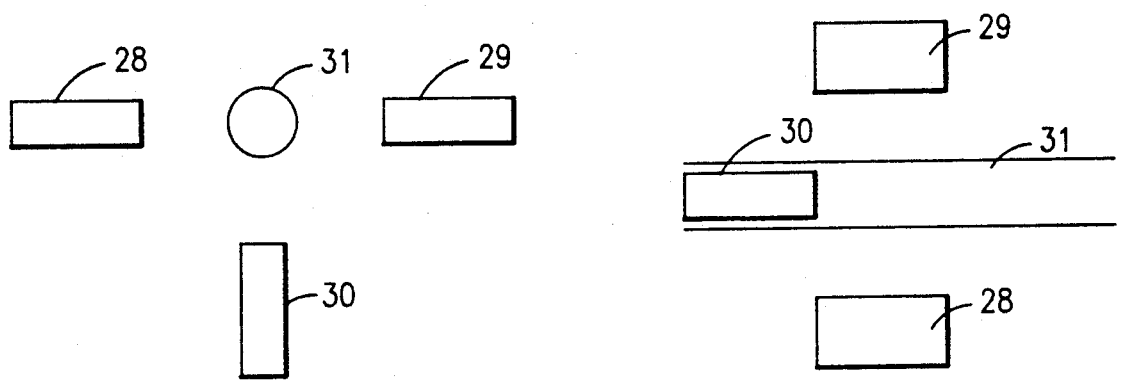
FIG. 10 is an axial view of an arrangement of three burner heads around a glass tube.
FIG. 11 is a top view of the burner head arrangement of FIG. 10.

The properties of the burner head explained in FIG. 1 are made use of by the invention when is it a matter of achieving a temperature profile adapted to the ideal temperature profile in the heat treatment of a glass tube for the internal coating of glass particles deposited from the gas phase. FIG. 10 thus shows a total of three burner heads 28, 29 and 30, of which, as shown by this figure, the burner heads 28 and 29 are arranged laterally to the tube 31 to be treated, while the burner head 30, with its nozzles, is directed against the glass tube from underneath. The flame profiles determined by the rectangular design of the burner heads thus permit an optimal temperature limitation in the treatment region of the tube and a smaller number of burner heads is already sufficient to ensure the necessary temperatures for the duration of operation in the treatment region of the tube. The longitudinal uniformity of the deposit is improved, and the deposition rate overall is increased by constant temperature profile characteristics.

In a supplement to FIG. 10, FIG. 11, in a different view, shows the arrangement of the three burner heads 28, 29 and 30 with respect to the glass tube 31. From this figure it can be seen that the narrow sides of the burner heads 28 and 29 are located in a plane transverse to the longitudinal direction of the tube 31, in order to ensure the desired sharpness of separation of the flame profile. The burner head 30 is displaced in the direction of the tube axis in the direction of the inflowing gases, from which the glass particles are separated. This advancement of the burner head 30 with respect to the burner heads 28 and 29 leads to the fact that the acted-upon region of the glass tube 31 is heated at steep temperature gradients, whereas the tube temperature is maintained and the inflowing gases are preheated by means of the burner head 30. This preheating by means of the sharply-defined flame profile leads to a significant increase in the chemical reaction in the tube and in the degree of deposition efficiency (thermophoresis) as compared with previous possibilities. In addition, the burner head arrangement shown produces a uniformization of the temperature distribution with respect to the glass tube 31 that is to be treated and irregularities in the temperature course are prevented, so that, following the temperature profile shown in the main patent, one can work with a closer approximation to the ideal temperature profile in the internal coating of glass tubes for the production of preforms for glass fibers.

What is claimed is:

1. An arrangement for the temperature treatment of glass tubes in the production of preforms used in the manufacture of glass fiber optical waveguides comprising:
   a glass tube having an axial axis; and
   at least one burner head located adjacent to the glass tube comprising a burner body having a plane surface, a plurality of gas outlet nozzles formed in the plane surface and arranged in a rectangular area of the plane surface to produce a rectangular flame formation for temperature treatment of the glass tube for producing a preform for a glass fiber optical waveguide with a core and a cladding.

2. An arrangement according to claim 1, further comprising means to produce relative movement between the glass tube and the at least one burner head in a direction of the axial axis of the glass tube.

3. An arrangement according to claim 1, wherein a gas mixture of at least two difference mixture components is supplied to the gas outlet nozzles, the different mixture components being supplied to different gas outlet nozzles, the gas outlet nozzles for the different mixture components have different geometric shapes.

4. An arrangement according to claim 3, wherein the mixture components are hydrogen and oxygen and the velocity of oxygen is three times the velocity of hydrogen.

5. An arrangement according to claim 3, wherein an external longitudinal limitation of the area is represented by gas outlet nozzles in the form of slots for one mixture component, between which there are arranged holes as gas outlet nozzles for a second mixture component.

6. An arrangement according to claim 5, wherein the holes are arranged in rows in parallel with the lateral slots.

7. An arrangement according to claim 6, wherein the spacing of the holes in the longitudinal direction is non-uniform.

8. An arrangement according to claim 3, wherein the burner head comprises:
   a basic body with holes as gas outlet nozzles; and
   separate side parts, which, in a state of assembly with the basic body, form the slot-shaped gas outlet nozzles between themselves and the surface of the basic body.

9. An arrangement according to claim 8, wherein the basic body and side parts are welded to each other.

10. An arrangement according to claim 8, wherein the basic body has a profile with a T-shaped cross-section, in whose recesses on both sides the side parts, designed as plates, for the completion of a burner head with a rectangular cross-section are integrated.

11. An arrangement according to claim 8, wherein the side parts are designed as plates and feature a longitudinally proceeding web which, by joining of the side part in question with the basic body form an upper and a lower chamber for one mixture component, in which the spatial connection between the two chambers takes place by means of a longitudinally proceeding slot remaining between the web and the basic body.

12. An arrangement according to claim 4, including:
   inlets for the mixture components located on a side of the burner head opposite to the gas outlet nozzles; and
   chambers with a large volume, as compared with the dimensions of the slots and holes, said inlets connecting respectively to the chambers to which the holes and slots are connected.

13. An arrangement according to claim 4, wherein between the holes for the second mixture component, there is located at least one row of additional gas outlet nozzles for the first mixture component of the gas mixture.

14. An arrangement according to claim 13, wherein the additional gas outlet nozzles are slots.

15. An arrangement according to claim 13, wherein the additional gas outlet nozzles are holes.

16. An arrangement according to claim 15, wherein the spacings of the holes for the first mixture component with respect to each other are independent of those of the holes for the second mixture component.

17. An arrangement according to claim 13, wherein the additional gas outlet nozzles for the first mixture component end in a large-volume chamber for the first mixture component at the ned facing away from the exit plane.

18. An arrangement according to claim 13, wherein the additional gas outlet nozzles are supplied by separate gas supply lines connectable to the burner head.

19. An arrangement according to claim 13, wherein the additional gas outlet nozzles are supplied by the same gas supply lines as the slot-shaped gas outlet nozzles, with the division of the gas flow taking place in the interior of the burner head.

20. A burner head for gas burners for the temperature treatment of a profile, particularly for the temperature treatment of an elongated profile, in which a relative movement between the profile and the burner head takes place, said burner head comprising:
    a burner body having a plane surface;
    a plurality of gas outlet nozzles formed in the plane surface and arranged in a rectangular area of the plane surface to produce a rectangular flame formation for temperature treatment of the profile; and
    separating deflecting surfaces provided in the area of the gas outlet nozzles.

21. An arrangement of burner heads for the temperature of a profile, particularly for the temperature treatment of an elongated profile, in which a relative movement between the profile and the burner heads take place, the profile is a glass tube for the production of preform used in the manufacture of glass fiber optical waveguides, comprising:
    at least two burner heads located adjacent to the glass tube, each burner head comprising a burner body having a plane surface, a plurality of gas outlet nozzles formed in the plane surface of each burner and being arranged in a rectangular area of the plane surface for the production of a rectangular flame formation for temperature treatment of the glass tube for the production of a preform for glass fiber optical waveguides with a core and a cladding, wherein the at least two burners comprise:
    two burner heads located lateral to the glass tube and opposite to each other; and
    burner heads located below the glass tube, with combustion surfaces proceeding in the axial direction of the glass tube and being rectangular in shape.

22. An arrangement according to claim 21, wherein the burner head located below the glass tube is arranged in an axial direction before the two lateral burner heads.

23. An arrangement according to claim 21, wherein the edges of the burner heads facing each other in an axial direction are located in the same plane.

* * * * *

UNITED STATES PATENT AND TRADEMARK OFFICE
CERTIFICATE OF CORRECTION

PATENT NO. : 5,255,854

DATED : October 26, 1993

INVENTOR(S) : Norbert Keim, et al.

It is certified that error appears in the above-identified patent and that said Letters Patent is hereby corrected as shown below:

Col. 10, line 17, "difference" should be --different--;

Col. 11, line 17, "ned" should be --end--;

Col. 12, line 6, after "temperature", insert --treatment--.

Signed and Sealed this

Fourteenth Day of June, 1994

Attest:

BRUCE LEHMAN

*Attesting Officer*     *Commissioner of Patents and Trademarks*